US010263832B1

(12) United States Patent
Ghosh

(10) Patent No.: US 10,263,832 B1
(45) Date of Patent: Apr. 16, 2019

(54) PHYSICAL INTERFACE TO VIRTUAL INTERFACE FAULT PROPAGATION

(71) Applicant: Juniper Networks, Inc., Sunnyvale, CA (US)

(72) Inventor: Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 56 days.

(21) Appl. No.: 15/394,585

(22) Filed: Dec. 29, 2016

(51) Int. Cl.
*H04L 12/26* (2006.01)
*H04L 12/24* (2006.01)

(52) U.S. Cl.
CPC .......... *H04L 41/06* (2013.01); *H04L 43/0823* (2013.01)

(58) Field of Classification Search
None
See application file for complete search history.

(56) References Cited

U.S. PATENT DOCUMENTS

| 7,627,899 | B1 | 12/2009 | Tripathi et al. | |
|---|---|---|---|---|
| 8,761,187 | B2 | 6/2014 | Barde | |
| 8,990,799 | B1 | 3/2015 | Forecast | |
| 9,384,033 | B2 | 7/2016 | Jain et al. | |
| 2007/0260910 | A1* | 11/2007 | Jain | G06F 11/0712 714/4.1 |
| 2008/0140824 | A1* | 6/2008 | Jain | G06F 9/5077 709/224 |
| 2008/0162800 | A1* | 7/2008 | Takashige | G06F 9/5077 711/104 |
| 2010/0054260 | A1 | 3/2010 | Pandey et al. | |
| 2010/0153514 | A1 | 6/2010 | Dabagh et al. | |
| 2011/0107148 | A1* | 5/2011 | Franklin | G06F 11/0712 714/37 |
| 2011/0314469 | A1 | 12/2011 | Qian et al. | |
| 2012/0005521 | A1* | 1/2012 | Droux | G06F 11/2005 714/4.11 |
| 2012/0099602 | A1 | 4/2012 | Nagapudi et al. | |
| 2012/0140675 | A1* | 6/2012 | Mishra | H04L 41/5038 370/254 |
| 2012/0185846 | A1* | 7/2012 | Recio | G06F 9/5077 718/1 |
| 2013/0061047 | A1 | 3/2013 | Sridharan et al. | |

(Continued)

FOREIGN PATENT DOCUMENTS

WO 2013184846 A1 12/2013

OTHER PUBLICATIONS

U.S. Appl. No. 14/673,272, by Rajagopalan Sivaramakrishnan, filed Mar. 30, 2015.

(Continued)

*Primary Examiner* — Anh Vu H Ly
(74) *Attorney, Agent, or Firm* — Shumaker & Sieffert, P.A.

(57) ABSTRACT

In some examples, a computing device includes one or more processors and a physical interface device (IFD) connected to one or more of the processors. One or more of the processors are configured to detect a change in physical link status for a physical link in a network interface card, receive a list of active virtual machines associated with the physical link, and transmit a virtual IFD status notification message to the active virtual machines of virtual IFDs impacted by the physical link status change, the virtual IFD status notification message identifying the physical link status change.

21 Claims, 9 Drawing Sheets

(56) References Cited

U.S. PATENT DOCUMENTS

| | | | |
|---|---|---|---|
| 2013/0227338 A1* | 8/2013 | Lingafelt | H04L 41/0654 |
| | | | 714/4.5 |
| 2014/0185616 A1 | 7/2014 | Bloch et al. | |
| 2015/0304158 A1* | 10/2015 | Dharmadhikari | H04L 41/046 |
| | | | 714/37 |
| 2015/0312141 A1* | 10/2015 | Sato | H04L 45/28 |
| | | | 370/242 |
| 2016/0212068 A1* | 7/2016 | Sato | H04L 49/70 |
| | | | 370/242 |
| 2016/0373337 A1 | 12/2016 | DeCusatis et al. | |
| 2017/0104622 A1* | 4/2017 | Sawal | H04L 41/046 |
| | | | 370/242 |
| 2017/0214600 A1* | 7/2017 | Moxnes | H04L 49/358 |
| | | | 370/252 |

OTHER PUBLICATIONS

"Intel VMDq Technology: Notes on Software Design Support for Intel VMDQ Technology," Intel Corporation, Revision 1.2, Mar. 2008, 22 pp.

"Vhost Sample Application—DPDK documentation," DPDK Organization, retrieved from http://dpdk.org/doc/guides/sample_app_ug/vhost.html on Feb. 19, 2015, 16 pp.

"Intel 82599 10 GbE Controller Datasheet," Intel Corporation, Revision 3.1, Feb. 1, 2015, 1052 pp.

Jones, "Virtio: An I/O Virtualization framework for Linux," IBM, DeveloperWorks, Jan. 29, 2010, 7 pp.

"PCI-SIG Single Root I/O Virtualization (SR-IOV) Support in Intel Virtualization Technology for Connectivity," Intel Corporation, Feb. 2, 2008, 4 pp.

* cited by examiner

PHYSICAL INTERFACE TO VIRTUAL INTERFACE FAULT PROPAGATION

TECHNICAL FIELD

Techniques of this disclosure relate generally to computer networks and more particularly to virtual networks.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host infrastructure equipment, such as networking and storage systems, redundant power supplies, and environmental controls. In a typical data center, clusters of storage systems and application servers are interconnected via high-speed switch fabric provided by one or more tiers of physical and/or virtual network switches and routers. More sophisticated data centers provide infrastructure spread throughout the world with subscriber support equipment located in various physical hosting facilities.

In a virtualized environment, multiple virtual machines (VMs) running on, for instance, a server may share a single physical interface device (IFD). The host may create multiple virtual interfaces and may map the virtual interfaces to the physical IFD using, for instance, a virtual bridge. The virtual bridge forwards ingress/egress traffic from virtual interface devices (virtual IFDs) to and from the physical IFDs, thus enabling the VMs to communicate with the outside world.

SUMMARY

In general, techniques are described for detecting a state change in a physical interface device and propagating the state change to virtual machines associated with the physical interface device. In one approach, a physical interface fault detector detects a state change in the physical interface device and notifies each virtual machine associated with the physical interface device of the change in state.

In one example approach, a method includes detecting a change in physical link status for a physical link in a network interface card; receiving a list of active virtual machines associated with the physical link, wherein each active virtual machine associated with the physical link includes one or more virtual interface devices (IFDs), wherein each virtual IFD sends and receives information via the physical link; and transmitting a virtual IFD status notification message to the active virtual machines of virtual IFDs impacted by the physical link status change, the virtual IFD status notification message identifying the physical link status change.

In another example approach, a computing device includes a network interface card having at least one physical interface device (IFD), a memory, and a processor connected to the memory and to the network interface card, wherein the memory includes instructions stored therein, wherein the instructions, when executed by the processor, establishes an IFD fault monitor and a plurality of virtual machines, wherein each virtual machine includes a virtual IFD connected to the physical IFD, and wherein the IFD fault monitor detects a physical link status change in the physical IFD, determines virtual IFDs impacted by the physical link status change and sends a physical link status change notification to virtual machines that have virtual IFDs impacted by the physical link status change.

In yet another example approach, a system includes a network and a plurality of routing devices connected by the network, wherein one or more of the routing devices includes a computing device having a memory, a processor, and a physical interface device (IFD) connected the processor, wherein the physical IFD includes a physical link, wherein the memory includes instructions executable by the processor, the instructions when executed causing the processor to: detect a change in physical link status of the physical IFD; receive a list of active virtual machines associated with the physical IFD, wherein each active virtual machine associated with the physical IFD includes one or more virtual interface devices (IFDs), wherein each virtual IFD sends and receives information via the physical IFD; and transmit a virtual IFD status notification message to the active virtual machines of virtual IFDs impacted by the physical link status change, the virtual IFD status notification message identifying the physical link status change.

The details of one or more examples of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
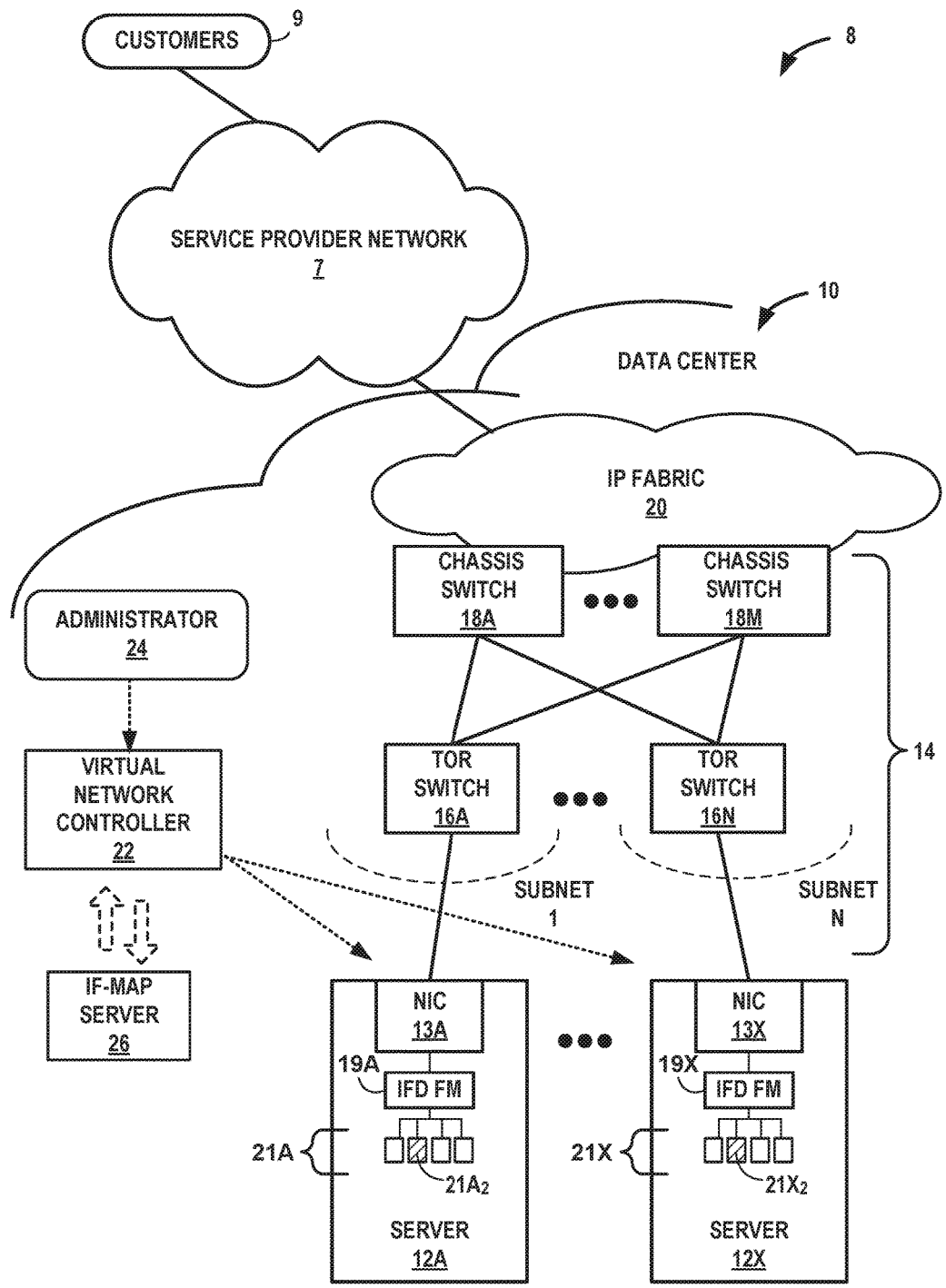
FIG. 1 is a block diagram illustrating an example network having a data center in which examples of the techniques described herein may be implemented.

As noted above, in a virtualized environment, multiple virtual machines (VMs) running on a computing device such as a server may share a single physical interface device (IFD). A host operating system executing on the computing device may create multiple virtual interfaces and may map the virtual interfaces to the physical IFD using, for instance, a virtual bridge. The virtual bridge forwards ingress/egress traffic from virtual interface devices (virtual IFDs) to and from the physical IFDs, thus enabling the VMs to communicate with the outside world.

Virtual bridges do not, however, propagate link faults. Because of that virtual interface device remain in an UP state irrespective of the state of underlying physical interface device. This discontinuity may create system level issues such as slow convergence, may lead to inefficient traffic rerouting when there are multiple paths, and may inhibit or prevent fast transmit and recovery (FRR) schemes. In addition, this discontinuity can lead to manageability issues such as incorrect alarm generation and the propagation of incorrect failure states. Finally, the discontinuity can lead to false routing engine switchover and failure of the, for instance, graceful routing engine switchover (GRES) feature in Junos OS.

To date, hardware and software-based solutions have been proposed to address these issues. In one-hardware-based approach, natively shared I/O devices (such as Single Root I/O Virtualization and Sharing, or SR-IOV) provide unique memory space, work queues, interrupts and command processing for each interface they expose while using common shared resources behind the host interface. Such approaches support fault propagation from physical to virtual link but require special hardware. Users need to upgrade their hardware to get the benefit of SR-IOV link fault propagation.

Software solutions typically involve periodic sensing such as polling of the physical interface device failure state or the use of a heartbeat packet. Such software-based approaches require changes in the virtual machine software, and they are not real time.

To address this issue, a technique is described for automatically detecting physical link failure in a physical interface device and for informing all the active virtual machines of the physical link failure. In one example approach, a program running on the computing device detects a physical link failure and informs the active virtual machines using libVirt/libVirt-Qemu. Detection is interrupt/event driven, so latency is very low.

In one example approach, the technique described solves the problem with a simple software program, without changing anything within virtual machine software. In one such example approach, the technique is implemented by a small application (which may be written in C or other suitable programming languages), and the application is run on the host OS. The application detects the physical link fault in real time and propagates the fault to each of the VMs impacted by the physical link failure in real time as well. As such, the technique is a simulation of virtual link fault with respect to virtual machines. For instance, virtual machines impacted by the fault see the fault as IFD Down (vtnet0/1). Each virtual machine may then take the necessary actions (such as, for instance, FRR or Alarm) based on the IFD down notification. In contrast to the existing approach, the current technique is neither hardware dependent nor virtual machine software-dependent. Instead, the solution is host driven. Similarly, when a link fault is resolved, each virtual machine sees the resolution of the fault as IFD Up (vtnet0/1). Each virtual machine may then take the necessary actions based on the IFD Up notification.

FIG. 1 is a block diagram illustrating an example network 8 having a data center 10 in which examples of the techniques described herein may be implemented. In general, data center 10 provides an operating environment for applications and services for customers 9 coupled to the data center 10 by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, network 8 may include many different geographically distributed network data centers 10. As illustrated in the example of FIG. 1, data center 10 may be a facility that provides network services for customers 9. Customers 9 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of servers 12A-12X (herein, "servers 12") interconnected via a high-speed switch fabric 14 provided by one or more tiers of physical network switches and routers. In some examples, servers 12A-12X include storage systems and application servers. In the example of FIG. 1, switch fabric 14 includes a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, edge routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 9 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Typically, the traffic between any two network devices, such as between network devices within IP fabric 20 (not shown) or between servers 12 and customers 9 or between servers 12, for example, may traverse the physical network using many different paths. For example, there may be several different paths of equal cost between two network devices. In some cases, packets belonging to network traffic from one network device to the other may be distributed among the various possible paths using a routing strategy called multi-path routing at each network switch node.

A packet flow or, more simply, "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Each of servers 12 may provide a virtualization environment that executes one or more virtual machines 21. In the illustrated example, server 12A executes virtual machines 21A, including virtual machine 21A$_2$, and server 12X executes virtual machines 21X. Each of the virtual machines 21 is associated with a virtual network within data center 10.

One or more of servers 12 may each include a virtual router that executes multiple routing instances for corresponding virtual networks within data center 10. Packets received by server 12A from the underlying physical network fabric, for instance, may include an outer header to allow the physical network fabric to tunnel the payload or "inner packet" to a physical network address for a network interface of server 12A that executes the virtual router. The outer header may include not only the physical network address of the network interface of the server but also a tunnel encapsulation header, which may include a virtual network identifier such as a VxLAN tag or Multiprotocol Label Switching (MPLS) label that identifies one of the virtual networks as well as the corresponding routing instance executed by the virtual router. In some cases, the outer header includes a virtual machine identifier that uniquely identifies, to a server 12, a virtual machine 21 executing on the server 12. The virtual machine identifier may be at least a portion of the virtual network identifier. For example, an MPLS label of a tunnel encapsulation header of an outer header for a packet may represent a virtual machine identifier that uniquely identifies a virtual machine executing on a server 12 to which the packet is destined. An inner packet may include an inner header having a destination L2 address and/or destination network address that conforms to the virtual network addressing space for the virtual network identified by the virtual network identifier.

Servers 12 include respective network interface cards 13A-13X (collectively, "NICs 13") by which servers 12 exchange packets with the switch fabric 14. NIC 13A, for example, includes one or more interface ports for transmitting and receiving packets via links coupling NIC 13A to TOR switch 16A. In some cases, NIC 13A may be coupled to multiple switches. In some cases, server 12A includes multiple NICs. Network interface cards may alternatively be referred to as "network interface controllers." An interface device (IFD) fault monitor 19 connected to each NIC 13 detects physical link failure in a physical interface device and informs all the active virtual machines of the physical link failure. In one example approach, a program running on server 12A detects a physical link failure in NIC 13A and informs the active virtual machines 21A using libVirt/libVirt-Qemu. Detection is interrupt/event driven, so latency is very low.

The technique solves the problem with a simple software program, without changing anything within virtual machine software. In one example approach, IFD fault monitor 19 may be implemented as a small C application (or application written in other suitable programming languages) running on the host OS, executed by digital logic circuitry of the corresponding one of servers 12. The digital logic circuitry detects the physical link fault in real time and propagates the fault to each interested VMs in real time as well, resulting in a simulation of the virtual link fault with respect to the virtual machines. Each virtual machine 21 is configured to receive the interface failure message. Each virtual machine 21 may then take the necessary actions (such as, for instance, FRR or Alarm) based on the IFD down notification. As noted above, in contrast to the existing approaches, the current technique is neither hardware dependent nor virtual machine software-dependent. Instead, the solution is host driven. Similarly, when a link fault is resolved, each virtual machine sees the resolution of the fault as IFD Up (vtnet0/1). Each virtual machine may then take the necessary actions based on the IFD Up notification. In some example approaches, status conditions such as throughput or error rate also are reported via IFD fault monitor. In some such example approaches, status conditions such as throughput or error rate are reported via IFD fault monitor when they pass through a programmable threshold.

In accordance with techniques described in this disclosure, NIC 13A is configured to directly send packet data for inbound tunneled packets to destination virtual machines 21 executing on server 12A. For example, NIC 13A may be configured to receive an inbound packet having an outer header. NIC 13A may identify destination virtual machine 21A$_2$ for the inbound packet using a virtual machine identifier included in the outer header. Upon identifying virtual machine 21A$_2$, NIC 13A may then send packet data for the inbound packet to the virtual machine 21A$_2$. Although described with respect to virtual machine 21A$_2$, NIC 13A may be configured to receive and directly send packet data in this way to any of virtual machines 21.

In some examples, NIC 13A sends packet data for a packet to virtual machine 21A$_2$ by writing the packet data to an address space of virtual machine 21A$_2$ using, e.g., a Direct Memory Access (DMA) transfer. NIC 13A may in this way eschew writing the packet data to an address space of the virtual router executed by server 12A. As a result, the virtual router need not copy at least a portion of the packet data from the address space of the virtual router to the address space of virtual machine 21A$_2$ upon the virtual router identifying the virtual machine 21A$_2$ using the inner header of the packet. Such an approach may improve memory and/or memory bus utilization and, at least in some cases, increase the rate at which server 12A may receive and process inbound packets. In some cases, each of the address spaces for each of virtual machines 21 is isolated from one another. In such cases in other words, each of virtual machines 21 has a unique or separate address space and the virtual machines 21 do not share address space with one another.

Figure 2:
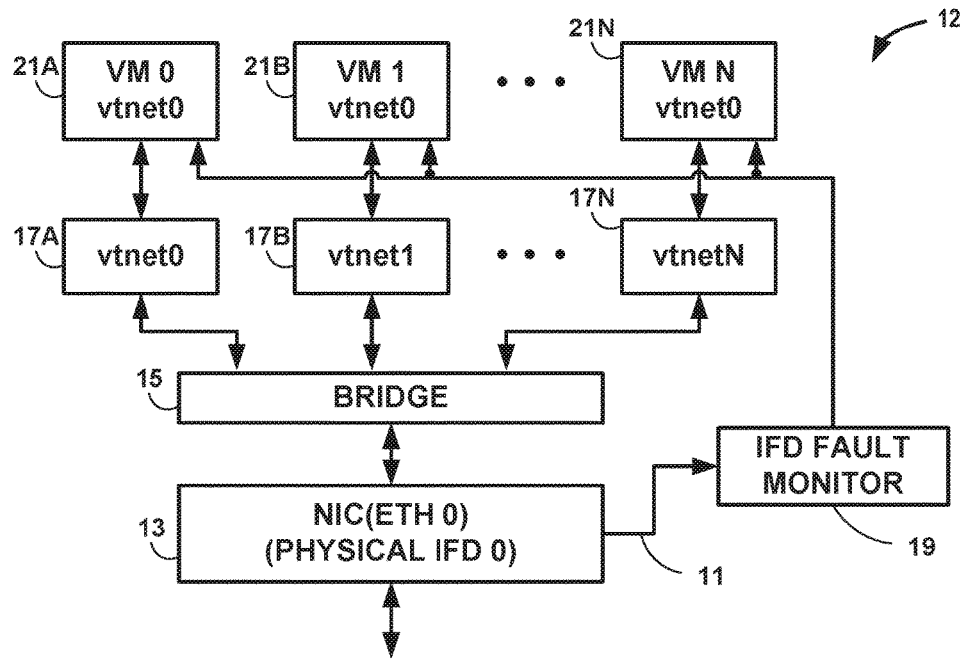
FIG. 2 is a block diagram illustrating a server with fault state monitoring according to techniques described in this disclosure.

FIG. 2 is a block diagram illustrating a server with fault state monitoring according to techniques described in this disclosure. In the block diagram of FIG. 2, server 12 includes one physical IFD (e.g., NIC 13) shared by N logical IFDs, one each for each of the VMs 21. Each VM 21 is connected through a virtual driver 17 to a virtual bridge 15. Virtual bridge 15 transfers data between the physical interface (NIC 13) and the virtual drivers 17. An interface device fault monitor 19 detects (via, e.g., interrupt 11 or other such event driven indicator) a change in state in one of the fault states of NIC 13 associated with, in this case, the Ethernet 0 link and communicates that change in state to each of the VMs 21 that are configured to transmit via the Ethernet 0 link.

Figure 3:
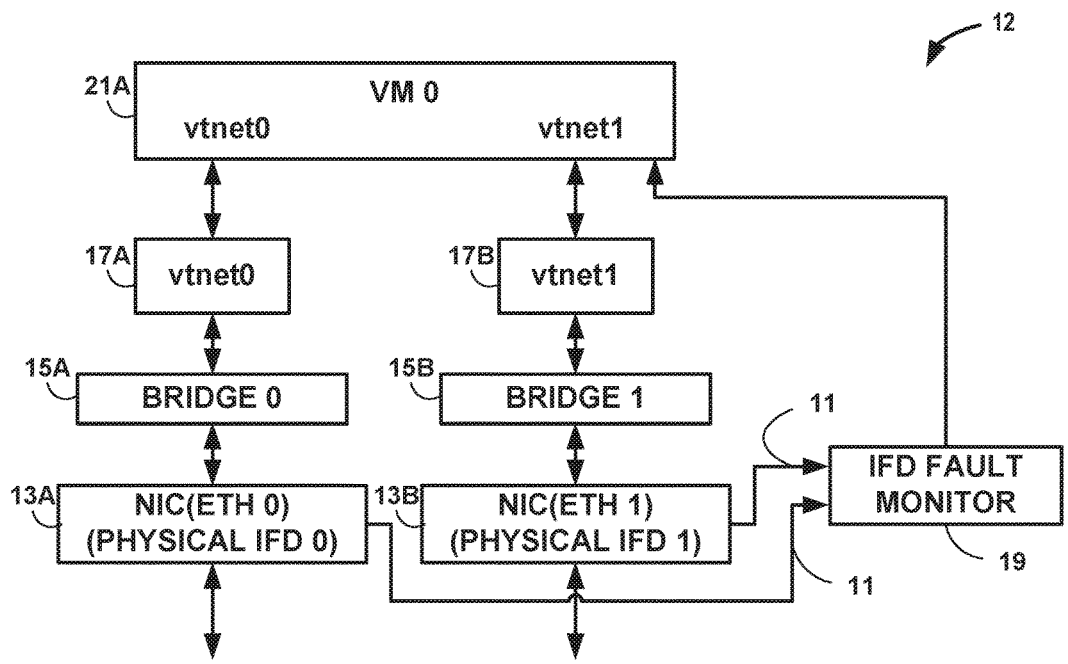
FIG. 3 is a block diagram illustrating a server with fault state monitoring according to techniques described in this disclosure.

FIG. 3 is a block diagram illustrating a server with fault state monitoring according to techniques described in this disclosure. In the block diagram of FIG. 3, server 12 includes two physical IFDs (e.g., eth0 and eth1 of NICs 13A and 13B, respectively) connected to two different ports of a virtual machine 21A. VM 21A is connected through a virtual driver 17A (labeled "vtnet0" in FIG. 3) to a virtual bridge 15A and through a virtual driver 17B (labeled "vtnet1" in FIG. 3) to a virtual bridge 15B. Virtual bridge 15A transfers data between the physical interface (NIC 13A) and the virtual driver 17A. Virtual bridge 15B transfers data between the physical interface (NIC 13B) and the virtual driver 17B. An interface device fault monitor 19 detects a change in state in one of the fault states of either NIC 13A or NIC 13B and, if the change in state impacts, in this case, the Ethernet 0 link or the Ethernet 1 link, IFD fault monitor 19 and communicates the change in state to VM 21.

In one example approach, there may be a need to reroute all the traffic of vtnet0 to vtnet1 whenever eth0 goes down. The rerouted traffic should, however, revert to vtnet0 whenever eth0 comes back up again. The real-time propagation of changes in fault state from the physical interface device to the virtual machine via IFD fault monitor 19 allows that to happen. In one example approach, real time propagation of link errors from host to guest VM may allow server 12 to limit or avoid routing engine (RE) switchover and limit or avoid dropping routing engine—packet forwarding engine (RE-PFE) socket connectivity.

Figure 4:
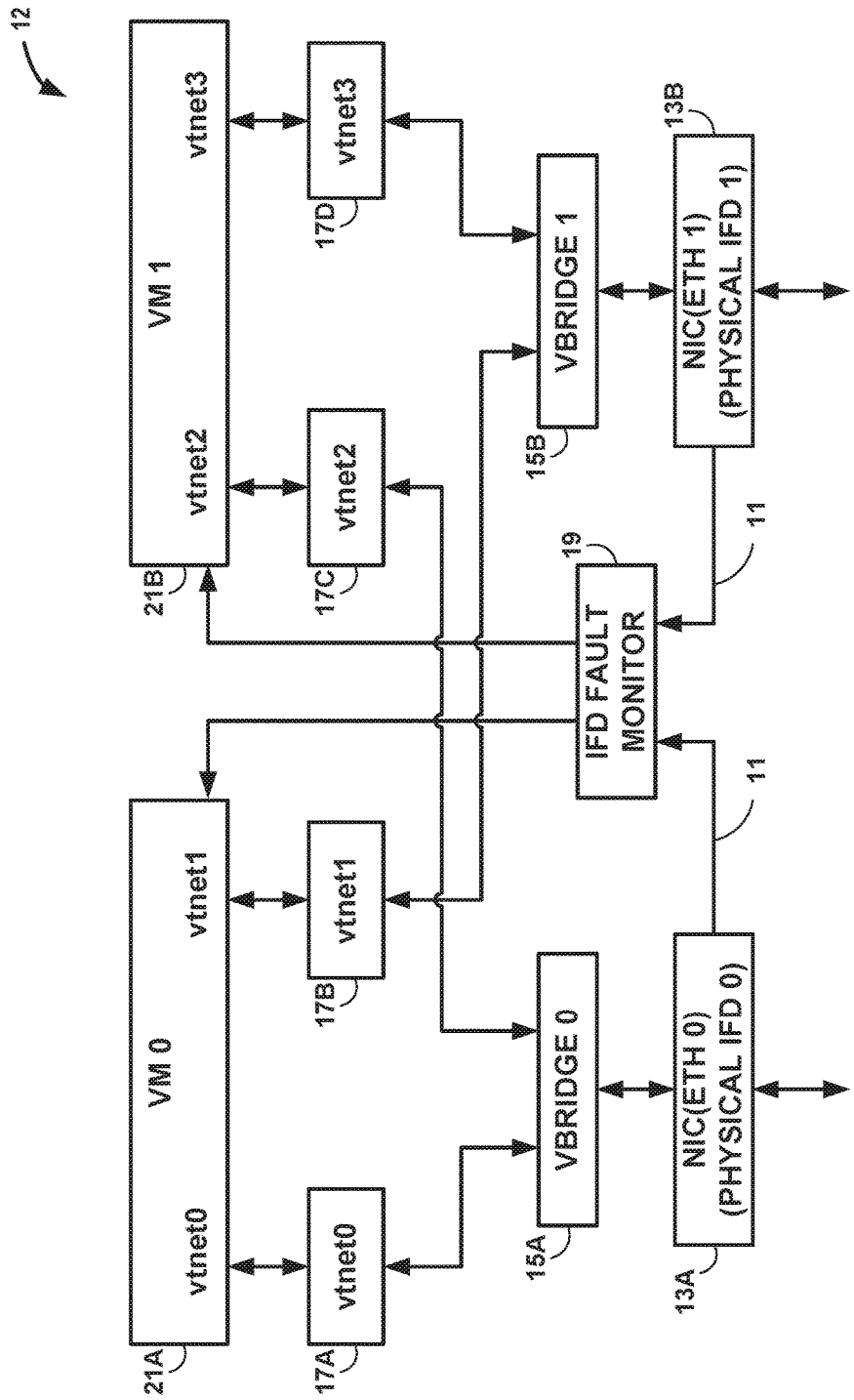
FIG. 4 is a block diagram illustrating a server with fault state monitoring according to techniques described in this disclosure.

FIG. 4 is a block diagram illustrating a server with fault state monitoring according to techniques described in this disclosure. In one example approach, as shown in FIG. 4, each VM 21 includes one virtual IFD for each physical IFD 13. In the block diagram of FIG. 4, server 12 includes two physical IFDs (e.g., NICs 13A and 13B) connected to two different ports of a virtual machine 21A and a virtual machine 21B. VM 21A is connected through a virtual driver 17A to a virtual bridge 15A and through a virtual driver 17B to a virtual bridge 15B. Virtual bridge 15A transfers data between the physical interface (NIC 13A) and the virtual driver 17A. Virtual bridge 15B transfers data between the physical interface (NIC 13B) and the virtual driver 17B.

In addition, VM 21B is connected through a virtual driver 17C to virtual bridge 15A and through a virtual driver 17D to a virtual bridge 15B. Virtual bridge 15A transfers data between the physical interface (NIC 13A) and the virtual driver 17C. Virtual bridge 15B transfers data between the physical interface (NIC 13B) and the virtual driver 17D. An interface device fault monitor 19 detects a change in state in one of the fault states of either NIC 13A or NIC 13B and, if the change in state impacts, in this case, the Ethernet 0 link or the Ethernet 1 link, IFD fault monitor 19 and communicates the change in state to VM 21A and VM 21B.

Figure 5A:
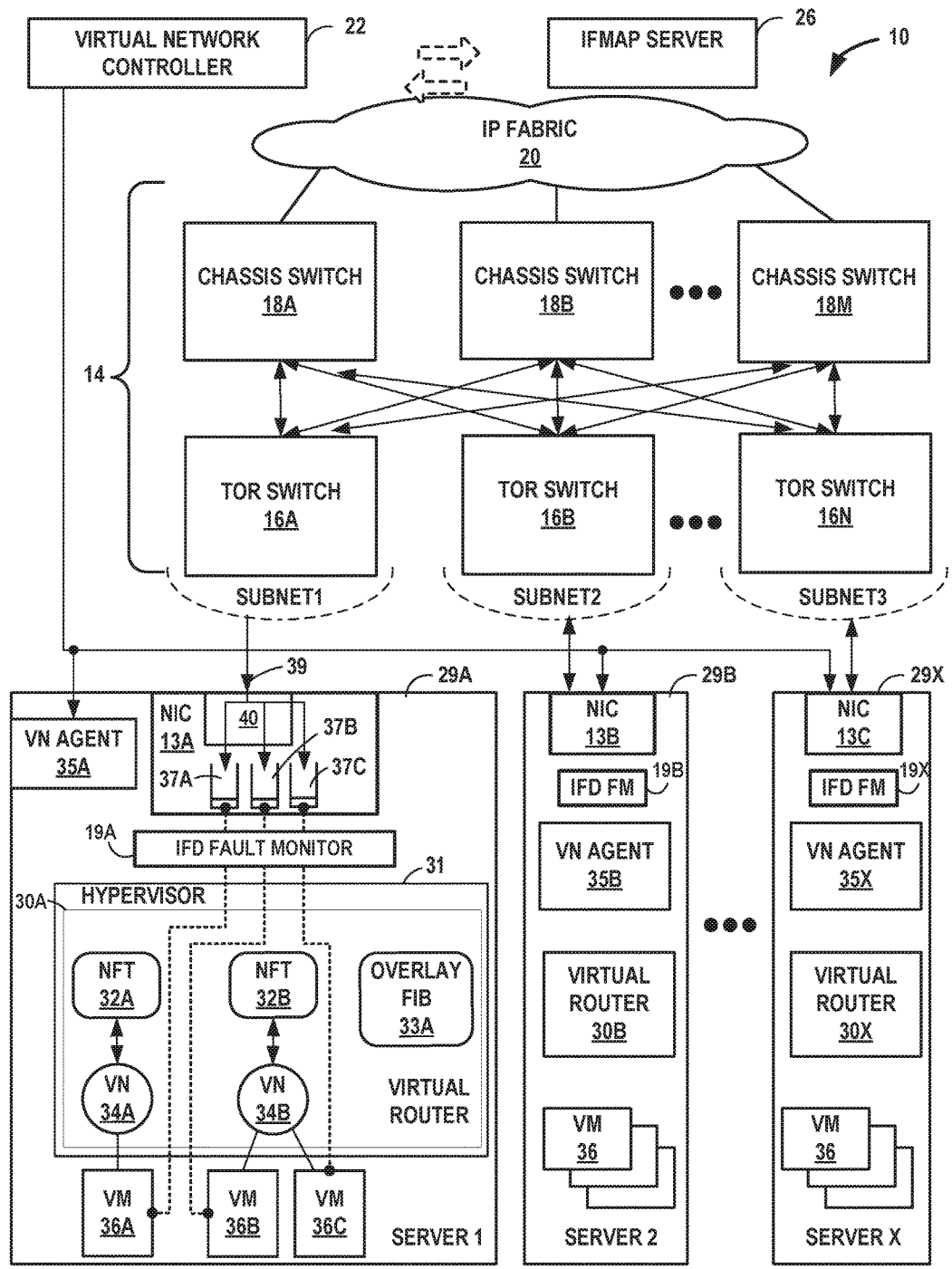
FIGS. 5A and 5B are block diagrams illustrating example implementations of data center 10 of FIG. 1 in further detail.
Figure 5B:
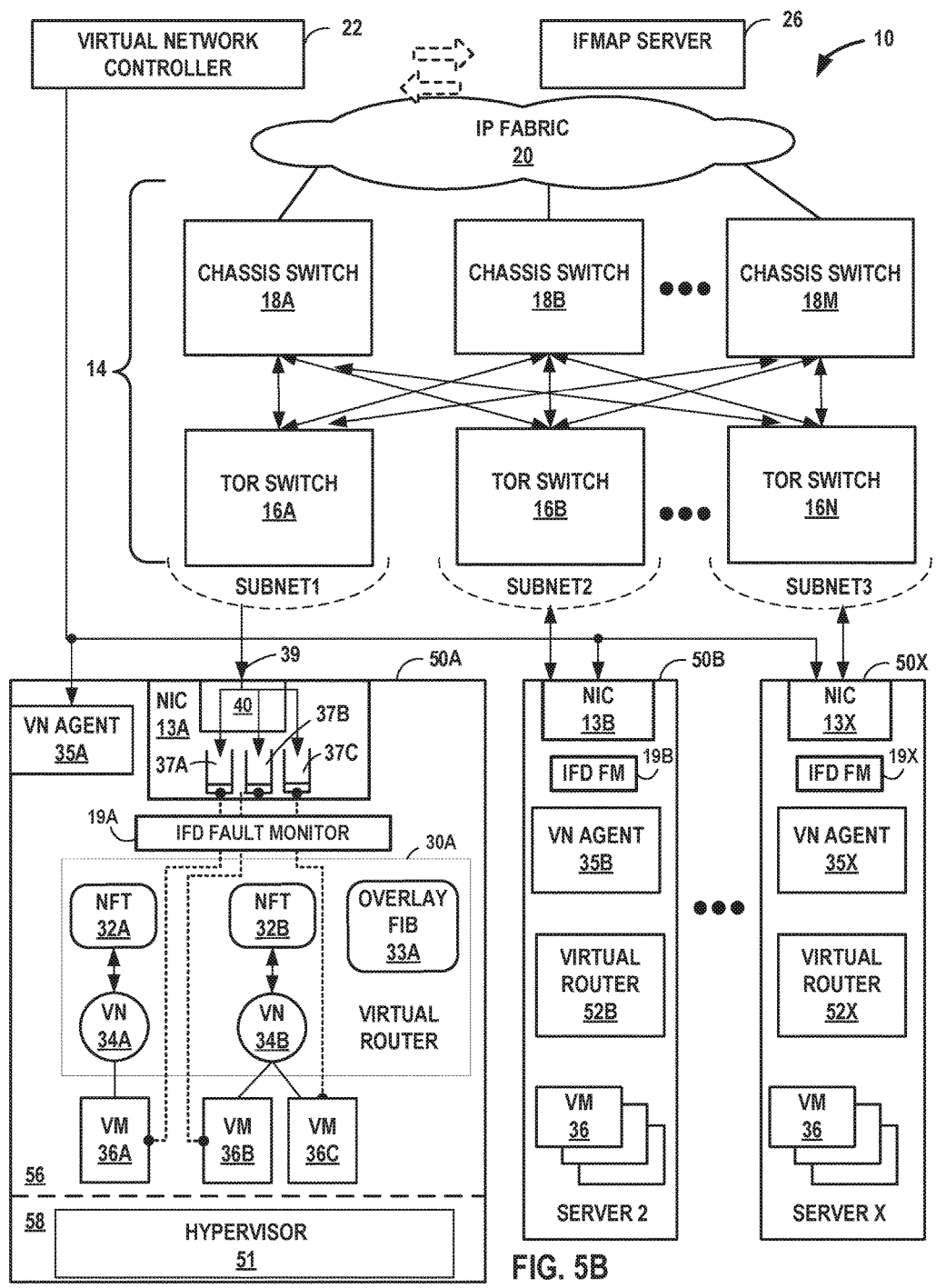

FIGS. 5A-5B are block diagrams illustrating example implementations of data center 10 of FIG. 1 in further detail. In the examples of FIGS. 5A-5B, data center 10 includes an overlay network that extends switch fabric 14 from physical switches 16, 18 to software or "virtual" switches 30A-30X (collectively, "virtual routers 30"). Virtual routers 30 dynamically create and manage one or more virtual networks 34 usable for communication between application instances. In one example, virtual routers 30 execute the virtual network as an overlay network, which provides the capability to decouple an application's virtual address from a physical address (e.g., IP address) of the one of servers 29A-29X ("servers 29") on which the application is executing. Servers 29 may represent example instances of servers 12 of FIG. 1. Each virtual network may use its own addressing and security scheme and may be viewed as orthogonal from the physical network and its addressing scheme. Various techniques may be used to transport packets within and across virtual networks 34 over the physical network. In some examples, the techniques described in this disclosure provide multicast service within virtual networks 34 without requiring multicast support in the underlying physical network.

Each virtual router 30 may execute within a hypervisor, a host operating system or other component of each of servers 29. Each of servers 29 may represent an x86-based, PowerPC-based, or other general-purpose or special-purpose server capable of executing virtual machines 36. Servers 29 may be located within racks of data center 10. Hypervisor 31, also often referred to as a virtual machine manager (VMM), provides a virtualization platform/environment that allows multiple guest operating systems to concurrently run on one of servers 12. An operating system kernel (not shown in FIG. 5A or 5B) may execute in kernel space and may include, for example, a Linux, Berkeley Software Distribution (BSD), another Unix-variant kernel, or a Windows server operating system kernel available from Microsoft Corp. Example hypervisors include Kernel-based Virtual Machine (KVM) for the Linux kernel, Xen, ESXi available from VMware, Windows Hyper-V available from Microsoft, and other open-source and proprietary hypervisors. In some examples, specialized hardware programmed with routing information may execute a portion of the virtual router 30A.

In the example of FIG. 5A, virtual router 30A is a kernel-level module executing within kernel space. In the example of FIG. 5B, virtual router 30A executes in user space 56 rather than in kernel space 58 of server 50A (an example instance of servers 12 of FIG. 1, in other respects like servers 29 of FIG. 5A). In general, user space 56 is allocated for running user processes, while kernel space 58 is protected and generally inaccessible by user processes. Additional details regarding instances of the techniques of this disclosure implemented using a virtual router executing in user space are described below with respect to FIG. 5B.

Virtual router 30A manages virtual networks 34A-34B (collectively, "virtual networks 34"), each of which provides a network environment for execution of one or more virtual machines (VMs) 36A-36C (collectively, "virtual machines 36") on top of the virtualization platform provided by hypervisor 31. Each of VMs 36 is associated with one of the virtual networks VNs 34 and may represent tenant VMs running customer applications, such as Web servers, database servers, enterprise applications, or hosting virtualized services used to create service chains. In some cases, any one or more of servers 29 or another computing device may host customer applications directly, i.e., not as virtual machines.

In general, each VM 36 may be any type of software application and may be assigned a virtual address for use within a corresponding virtual network 34, where each of the virtual networks may be a different virtual subnet provided by virtual router 30A. A VM 36 may be assigned its own virtual layer three (L3) IP address, for example, for sending and receiving communications but may be unaware of an IP address of the physical server 12A on which the virtual machine is executing. In this way, a "virtual address" is an address for one of VMs 36, operating within corresponding virtual network 34, that differs from the logical address for the underlying, physical computer system, e.g., server 29A in the example of FIGS. 5A and 5B. As another example, a VM 36 may also be assigned its own virtual layer two (L2) address, for example, for sending and receiving communications in an L2 virtual private network (L2VPN) provided by data center 10 as one of virtual networks 34.

In one implementation, each of servers 29 includes a corresponding one of virtual network (VN) agents 35A-35X (collectively, "VN agents 35") that controls the overlay of virtual networks 34 and that coordinates the routing of data packets within server 29. In general, each VN agent 35 communicates with virtual network controller 22, which generates commands to control routing of packets through data center 10. VN agents 35 may operate as a proxy for control plane messages between virtual machines 36 and virtual network controller 22. For example, a VM 36 may request to send a message using its virtual address via the VN agent 35A, and VN agent 35A may in turn send the message and request that a response to the message be received for the virtual address of the VM 36 that originated the first message. In some cases, a VM 36 may invoke a procedure or function call presented by an application programming interface of VN agent 35A, and the VN agent 35A may handle encapsulation of the message as well, including addressing.

In one example, network packets, e.g., layer three (L3) IP packets or layer two (L2) Ethernet packets, generated or consumed by the instances of applications executed by virtual machines 36 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed within virtual routers 30, e.g., within the hypervisor 31 or the host operating system running on each of servers 29. As another example, encapsulation and de-capsulation functions may be performed at the edge of switch fabric 14 at a first-hop TOR switch 16 that is one hop removed from the application instance that originated the packet. This functionality is referred to herein as tunneling and may be used within data center 10 to create one or more overlay networks each implementing one of virtual networks 34. Besides IPinIP, other example tunneling protocols that may be used include IP over GRE, VxLAN, MPLS over GRE (MPLSoGRE), MPLS over UDP (MPLSoUDP), MPLS over MPLS (MPLSoMPLS), etc.

As noted above, virtual network controller 22 provides a logically centralized controller for facilitating operation of one or more virtual networks within data center 10. Virtual network controller 22 may, for example, maintain a routing information base, e.g., one or more routing tables that store routing information for the physical network as well as one or more overlay networks of data center 10. Similarly, switches 16, 18 and virtual routers 30 maintain routing information, such as one or more routing and/or forwarding tables. In one example implementation, virtual router 30A of hypervisor 31 implements respective network forwarding tables (NFTs) 32 for virtual network 34s. In general, each NFT 32 stores forwarding information for the corresponding virtual network 34 and identifies where data packets are to be forwarded and whether the packets are to be encapsulated in a tunneling protocol, such as with a tunnel header that may include one or more headers for different layers of the virtual network protocol stack. For instance, NFT 32A may represent a L2/MAC forwarding information base (FIB) for a Layer 2 overlay network. NFT 32A may alternatively represent an IP FIB for a Layer 3 overlay network.

As one example, virtual machine 36A may send a packet (an example of an "inner packet" or "tunneled packet") to virtual router 30A by an internal link or operation. Virtual router 30A uses NFT 32A to look up a virtual network destination network address for the packet. In one example approach, NFT 32A specifies an outbound interface of virtual router 30A and encapsulation for the packet. Virtual router 30A applies the encapsulation to add a tunnel header to generate an "outer packet" or "tunnel packet" and outputs the outer packet on an outbound interface for server 29A, in this case toward TOR switch 16A.

The forwarding information of NFTs 32 may, for example, map packet key information (e.g., destination IP information, destination MAC information, and/or other select information from packet headers) to one or more specific next hops within the networks provided by virtual routers 30 and switch fabric 14. In some case, the next hops may be chained next hops that specify a set of operations to be performed on each packet when forwarding the packet, such as may be used for flooding next hops and multicast replication.

As noted above, the forwarding information of NFTs 32 may include tunnel encapsulation information for implementing the type of overlay network for the corresponding virtual network. (Typically, each of VNs 34 implements the same type of overlay network.) For example, for an MPLSoGRE-based L3 overlay network, an entry in NFT 32 may include a /32 or /128 route to match a destination IP address for a destination virtual machine 36 of VMs 36 executing on server 29B. The corresponding tunnel encapsulation information for the entry may specify a GRE header for routing within the core (switches 16, 18 switch based on the outer header), as well as an MPLS label that uniquely identifies the destination virtual machine 36, among VMs 36 of server 29B, to components of server 29B. The MPLS label may be allocated by virtual router 30B or by VNC 22, for instance, to be locally significant to server 29B. In some examples, virtual routers 30 may allocate MPLS labels (or other virtual machine identifiers) from an MPLS label space (or other virtual machine identifier type space) reduced from the standard MPLS label space (or other virtual machine identifier type space. For instance, virtual routers 30 may allocate MPLS labels drawn from a reduced MPLS label space defined by fewer than the 20 bits of the standard MPLS label space. In some examples, the reduced MPLS label space is 16 bits/2 bytes.

Overlay FIB 33A includes entries that map tunnel encapsulation information to one of virtual networks 34. Entries of overlay FIB 33A may also, more specifically, map the tunnel encapsulation information to individual VMs 36 of server 29A. For example, again for an MPLSoGRE-based L3 overlay network, an entry in overlay FIB 33A may match an MPLS label and specify one of virtual networks 34. The entry may also, or alternatively, specify one of VMs 36 of server 29A. On receipt of an MPLSoGRE packet of inbound packets 39 from TOR switch 16A, virtual router 30A may strip the GRE header to reveal the MPLS label. Virtual router 30A may then perform a lookup operation with respect to overlay FIB 33A to attempt to identify an entry matching the MPLS label. Upon identifying a matching entry, virtual router 30 removes the MPLS header and injects the inner packet into the matching virtual network 34, which routes the inner packet to the appropriate one of VMs 36 based on destination address information of the inner header for the inner packet.

Thus, as shown in FIGS. 5A and 5B, each of virtual networks 34 provides a communication framework for encapsulated packet communications for the overlay networks established through switch fabric 14. In this way, network packets associated with any of virtual machines 36 may be transported as encapsulated packet communications via the corresponding overlay network.

Virtual network controller 22 and virtual routers 30 may communicate in accordance with a default network forwarding table (not shown) during discovery and initialization of an overlay network, and during conditions where a failed link has temporarily halted communication via the overlay network. Once connectivity with the virtual network controller 22 is established, the virtual network controller 22 updates its local routing table to take into account new information about any failed links and directs virtual routers 30 to update their local network forwarding tables 32. For example, virtual network controller 22 may output commands to virtual network agents 35 to update one or more NFTs 32 to direct virtual routers 30 to change the tunneling encapsulation so as to re-route communications within the overlay network, for example to avoid a failed link.

When link failure is detected, a virtual network agent 35 local to the failed link (e.g., VN Agent 35A) may immediately change the encapsulation of network packet to redirect traffic within the overlay network and notifies virtual network controller 22 of the routing change. In turn, virtual network controller 22 updates its routing information and issues messages to other virtual network agents 35 to update local routing information stored by the virtual network agents within network forwarding tables 32.

In the example shown in FIGS. 5A and 5B, an interface device fault monitor 19 connected to each NIC 13 detects physical link failure in a physical interface device and informs all the active virtual machines of the physical link failure. In one example approach, a program running on server 29A detects a physical link failure in NIC 13A and informs the active virtual machines 36A using libVirt/libVirt-Qemu. Detection is interrupt/event driven, so latency is very low.

In one example approach, IFD fault monitor 19 may be a C application running on the host OS. The application detects the physical link fault in real time and propagates the fault to each interested VMs in real time as well. As such, the result is a simulation of virtual link fault with respect to virtual machines. Each virtual machine 21 sees the fault as IFD down (vtnet0/1). Each virtual machine 21 may then take the necessary actions (such as, for instance, FRR or Alarm) based on the IFD down or up notification.

In one example approach, when a link fault is resolved, each virtual machine sees the resolution of the fault as IFD Up (vtnet0/1). Each virtual machine may then take the necessary actions based on the IFD Up notification. In some example approaches, status conditions such as throughput or error rate also are reported via IFD fault monitor. In some such example approaches, status conditions such as throughput or error rate are reported via IFD fault monitor when they pass through a programmable threshold.

Figure 6:
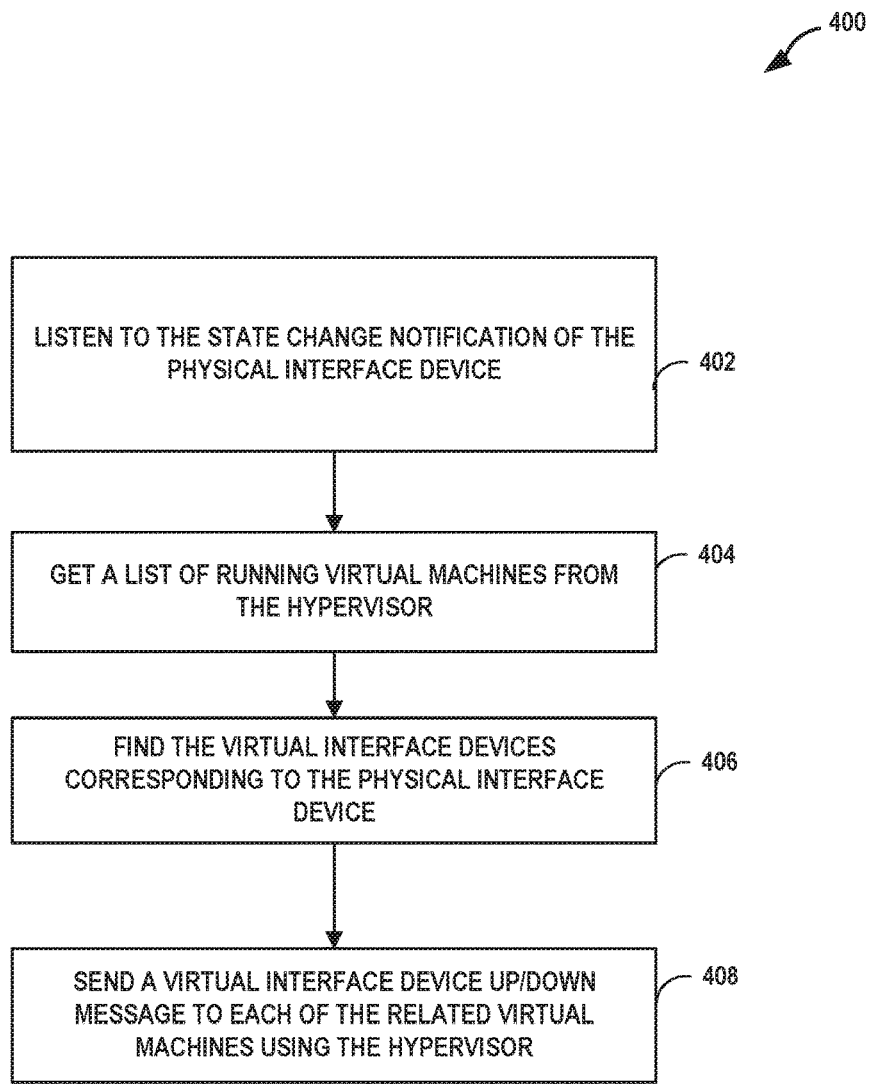
FIG. 6 is a flowchart illustrating one example method of detecting a failure in a link in a physical interface device and of notifying virtual machines of the failure, according to techniques described in this disclosure.

FIG. 6 is a flowchart illustrating one example method of detecting a failure in a link in a physical interface device and of notifying virtual machines of the failure, according to techniques described in this disclosure. In the example shown in FIG. 6, a monitoring program executing on a processor in, for example, servers 12, 29 or 50:

A. Listens to the physical IFD's state change notification (async). (402) In one example the state change is a failure in a link in the physical interface device.

B. Once any state change notification received, obtains the list of running VMs from hypervisor 51. (404)

C. Finds the Virtual IFDs corresponding to the physical IFD and creates a mapping of Physical IFD to Virtual IFD to VM. (406)

D. Sends Virtual IFD down to each related VMs using Hypervisor. (408)

In some example approaches, the monitoring program executes in kernel space on one or more processors in servers 12, 29 or 50. Similar mechanisms are used for Virtual IFD Up and other such notifications.

Returning to FIG. 5A, servers 29 include respective network interface cards 13A-13C (collectively, "NICs 13"). Each of NICs 13 performs substantially similar functionality, said functionality being described hereinafter with respect to NIC 13A. NIC 13A is configured with a plurality of receipt queues 37A-37C. Each of receipt queues 37 includes a packet buffer for storing packet data for packets received by server and a first-in-first-out (FIFO) data structure that manages the ordering of packets within the FIFO data structure. Each receipt queue of receipt queues 37 is associated with one of VMs 36 such that the associated VM dequeues packets for processing from the receipt queue. For instance, VM 36A dequeues packets from associated receipt queue 37A for processing. Although illustrated as located on-board NIC 13A, aspects of receipt queues 37 may be provided by other components of server 29A, such as system memory. For example, the packet buffers for receipt queues 37 may be stored in a system memory of server 39A. As described further below with respect to FIG. 6, the host memory may be mapped to the guest address spaces for VMs 36.

Either or both of the packet buffer or FIFO data structure of each of receipt queues 37 may also be located on-board NIC 13A. For example, NIC 13A may include packet buffer memory for storing packet data. In various examples, the size of the packet buffer on-board NIC 13A is 256 KB, 512 KB, 1 MB, etc. In some examples, however, NIC 13A is configured to use the on-board packet buffer as temporary packet storage while writing packets to the packet buffers in system memory for the receipt queues 37 to which classifier 40 has assigned the packets.

In accordance with techniques described herein, NIC 13A includes classifier 40 that assigns inbound packets, received by NIC 13A from TOR switch 16A, to one of receipt queues 37 based on virtual machine identifiers within the packets. Classifier 40 may represent a microprocessor, at least a portion of an application-specific integrated circuit (ASIC) or field-programmable gate arrays (FPGAs) or other equivalent integrated or discrete logic circuitry. Classifier 40 is configured with configuration data that defines associations between virtual machine identifiers and virtual machines 36 of server 29A. The configuration data may include filters that each match a virtual machine identifier and specify one of virtual queues 37.

Virtual machine identifiers may be included in tunnel encapsulation information for inbound packets 39. For example, the virtual machine identifiers may represent or be a portion of an MPLS label for inbound packets 39 for MPLSoMPLS-, MPLSoGRE-, and MPLSoUDP-based overlay networks.

When inbound packets arrive at NIC 13A, classifier 40 determines the correct receipt queue 37 using the virtual machine identifiers. In other words, classifier 40 assigns inbound packets 39 to one of receipt queues 37 based on the virtual machine identifiers included in the tunnel encapsulation information of the inbound packets. Classifier 40 may then write the packets to their assigned receipt queues 37. The virtual router 30A may then 'route' the packets to the virtual machines 36 corresponding to the receipt queues. The techniques may thus reduce a CPU utilization of virtual router 30A by offloading at least a portion of the routing (or switching) functionality to NIC 13A.

Each of receipt queues 37 thus queues packets for a particular virtual machine 36 of server 29. Virtual machines 36 may obtain packet data for packets directly from corresponding receipt queues 37, rather than from virtual router 30. For example, on receiving an indication that a packet has been enqueued to receipt queue 37A, VM 36A may read from the packet buffer of receipt queue 37A and process the packet. The techniques may thus avoid first writing the packets to the virtual router 30A space in system memory, which may improve bus and/or memory utilization by components of server 29A.

Figure 7:
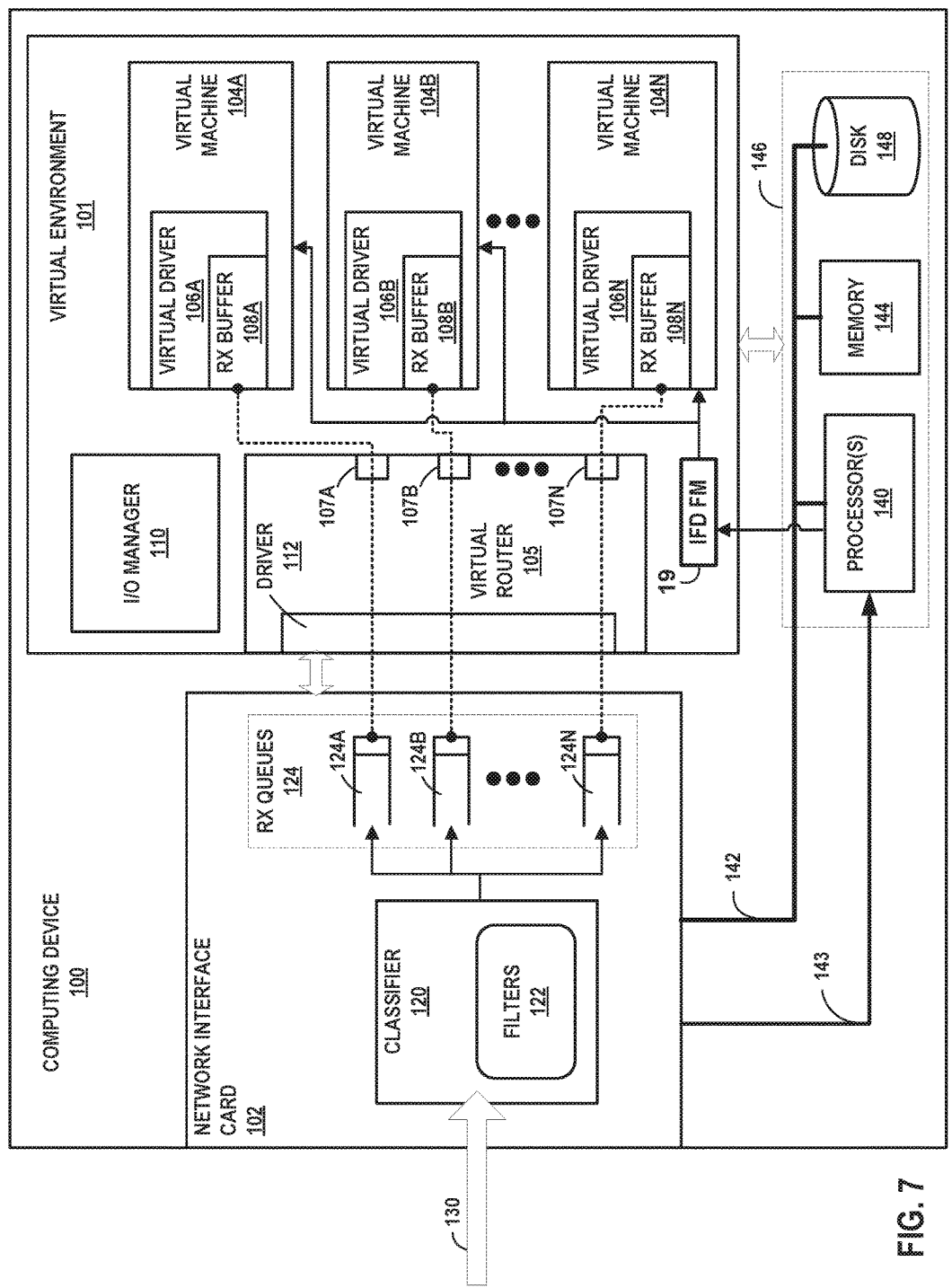
FIG. 7 is a block diagram illustrating a computing device having a configurable network interface card that assigns, based on virtual machine identifiers, packets to receive queues for virtual machines according to techniques described in this disclosure.

FIG. 7 is a block diagram illustrating a computing device having a configurable network interface card that assigns, based on virtual machine identifiers, packets to receive queues for virtual machines according to techniques described in this disclosure. Computing device 100 may represent any of servers 12 of FIG. 1, servers 29 of FIG. 5A, or servers 50 of FIG. 5B, for instance.

Computing device 100 includes in this example a bus 142 coupling hardware components of a computing device 100. Bus 142 couples memory 144, network interface cards (NIC) 102, storage disk 148, and one or more hardware-based processors 140. Bus 142 may include separate busses for I/O and system operations, as well as one or more I/O controllers, Direct Memory Access controllers, and switches, for example.

NIC 102 includes interfaces configured to exchange packets using links of an underlying physical network. NIC 102 may represent a Peripheral Component Interconnect (PCI) card having a bus interface that conforms to a PCIe, PCI-X, PCI, or other PCI-based standard. NIC 102 may alternatively have a bus interface that conforms to another bus standard. An I/O bus of bus 142 may represent PCI, PCIe/PCI-E, PCI-X, HyperTransport, Infiniband, I2C, or other types of I/O busses operative to communicatively couple NIC 102 to one or more processor(s) 140 and/or one or more memory devices of memory 144. NIC 102 may represent, for instance, an 82599 10 GbE Network Interface Controller manufactured by Intel© Corporation. Processor(s) 140 may include any number of processors and any number of hardware cores from, for example, four to thousands.

Disk 148 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by processor(s) 140.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144, NIC 102, storage disk 148, and processor(s) 140 provide an operating environment for a software stack that includes virtual environment 101 for execution of one or more virtual machines 104A-104N (collectively, "virtual machines 104") and an I/O manager 110. Virtual machines 104 may represent example instances of any of virtual machines 21 of FIG. 1 or virtual machines 36 of FIGS. 5A and 5B. Virtual environment 101 also includes an interface device fault monitor 19 in communication with processors 140. In one example approach, processors 140 receive notification of a fault state in network interface card 102 and communicate this change in state to IFD fault monitor 19. IFD, in turn, notifies each virtual machine 104 of the change in fault state associated with the network interface card 102. In one example approach, an IFD failure interrupt 143 transmits an interrupt from NIC 102 to processor 140. Processor, as part of the interrupt routine, notifies IFD fault monitor 19 of the change in fault state in NIC 102 and IFD fault monitor 19, in turn, notifies each of the virtual machines 104.

Driver 112 represents a device according to a software device model and provides device driver software routines for handling packets for receipt/transmission by NIC 102. Packets received by NIC 102 from the underlying physical network fabric for the virtual networks may include an outer header to allow the physical network fabric to tunnel the payload or "inner packet" to a physical network address for NIC 102. The outer header may include not only the physical network address but also a virtual network identifier such as a VxLAN tag or Multiprotocol Label Switching (MPLS) label that identifies a virtual network. An inner packet includes an inner header having a destination network address that conform to the virtual network addressing space for the virtual network identified by the virtual network identifier. The outer header further includes a tunnel encapsulation header that includes a virtual machine identifier.

Virtual router 105 "routes" packets among virtual machines 104 and NIC 102. Virtual router 105 may execute in a hypervisor or other VMM of computing device 100 (not shown in FIG. 7), or alternatively in user space. For example, I/O manager 110 may represent a user space process that executes virtual router 105, a separate virtual machine (such as a persistent specialized virtual machine), or other mode of operation. I/O manager 110 provides input/output (I/O) services to enable virtual machines 104 to process network I/O requests generated by software executing in the virtual machines 104 or resulting from a packet received by NIC 102.

Virtual router 105 includes driver 112 and back-end drivers 107A-107N (collectively, "back-end drivers 107"). Virtual router 105 may switch packets (e.g., routing packets at layer 3 or bridging packets at layer 2) to interconnect virtual machines 104, via driver 112, operating on multiple instances of computing device 100 using virtual networks.

Driver 112 in this example represents the physical driver for computing device 100, in that driver 112 is managed by I/O manager 110 to control and operate NIC 102 for computing device 100. Driver 112 may operate as a Poll Mode Driver (PMD) for fast virtual machine 104 to host communication. I/O manager 110 may initialize and configure, via driver 112, NIC 102 with filters 122.

This example of a computing device 100 includes back-end drivers 107 that emulate NIC 102 as virtual hardware to multiple virtual drivers 106A-106N (collectively, "virtual drivers 106") for respective virtual machines 104. In this respect, computing device 100 operates according to a split driver model. Back-end drivers 107 may communicate with virtual drivers 106 (alternatively, "front-end drivers 106") to form an abstraction layer over NIC 102, e.g., in a paravirtualized hypervisor. One example of such an abstraction layer is virtio, and in examples of computing device 100 in which back-end drivers communicate with virtual drivers 106 via virtio, virtual drivers 106 may represent "virtio drivers." Corresponding pairs of drivers 107 and 106 may communicate using, e.g., respective virtio rings or other types of virtual queues.

Virtual router 105 enables NIC 102 to classify and assign inbound packets 130 to one of receipt queues 124A-124N (collectively, "receipt queues 124" and illustrated as "rx queues 124") associated with respective virtual machines 104A-104N based on virtual machine identifiers of the inbound packets. In some examples, moreover, NIC 102 may directly write packet data for the packets to receipt buffers 108A-108N (collectively, "receipt buffers 108" and illustrated as "rx buffers 108") of respective virtual machines 104. For instance, virtual drivers 106 may post, via back-end drivers 107, memory locations of packet buffers within receipt buffers 108 to NIC 102. NIC 102 may write directly to these posted packet buffers, e.g., using a DMA transfer, so as to "send" a classified packet directly to a targeted virtual machine of virtual machines 104. In this way, NIC 102 may directly write packets classified by their respective virtual machine identifier to receipt buffers 108 in the memory spaces of virtual machines 104.

In some examples, however, NIC 102 "sends" a classified packet indirectly to a targeted virtual machine via virtual router 105. For example, virtual router 105 may post packet buffers of virtual router 105 to NIC 102 and performs a CPU memory copy from the packet buffers to the receipt buffer 108 of a targeted virtual machine of virtual machines 104.

Network interface card 102 is configured with receipt queues 124. Receipt queues 124 may represent example instances of receipt queues 37 of FIGS. 5A and 5B. As one example of receipt queues 124, receipt queue 124A is associated with virtual machine 104A such that packets assigned to receipt queue 124A by classifier 120 of NIC 102 are directed to virtual machine 104A. Receipt queue 142A includes a FIFO data structure that enqueues packet data and/or packet descriptions by which virtual router 105 may route packet data to the targeted virtual machine 104A.

Classifier 120 applies filters 122 to assign inbound packets to one of receipt queues 124 based on virtual machine identifiers of the inbound packets. In some examples, filters 122 include a filter for each of virtual machines 104. The filter for virtual machine 104A, for instance, matches a virtual machine identifier of inbound packets destined for virtual machine 104A. When applied by classifier 120, the filter causes classifier 120 to assign inbound packets having the virtual machine identifier to receipt queue 124A. Filters 122 may represent examples of flow director filters of the 82599 10 GbE Network Interface Controller manufactured by Intel© Corporation.

To assign an inbound packet to a receipt queue of receipt queues 124, classifier 120 may write a description of the inbound packet to the receipt queue. This description may be included in a data structure known as a "descriptor" or "receipt descriptor." The description may include, e.g., a receive packet buffer address for one of receipt buffers 108 and a length of the inbound packet. In some cases, receipt queues 124 represent "descriptor queues" in host memory and managed by I/O manager 110.

Along with assigning inbound packets to receipt queues 124, NIC 102 or virtual router 105 may "send" packets to targeted virtual machines 104. In some examples, NIC 102 or virtual router 105 may initiate, with a DMA controller, a DMA transfer to cause the DMA controller to read packet data for the packet from a buffer memory of NIC 102 and write the packet data to a packet buffer in one of receipt buffers 108. NIC 102 may write back the location of the packet buffer to a receipt queue 124 as part of enqueuing the packet to the receipt queue 124. Virtual router 105 may subsequently dequeue the location of the packet buffer for the packet from the receipt queue 124 and provide this location to the designated virtual machine 104 for the receipt queue 124. In this way, the virtual machine 104 may receive the packet "routed" by virtual router 105. In some examples, virtual router 105 may copy packet data from packet buffers in memory space for virtual router 105 to receipt buffers 108 to "send" the packets to the targeted virtual machines 104.

In one example approach, classifier 120 applies filters 122 to inbound packets 130 and assigns, based on the respective virtual machine identifiers, the inbound packets 130 to the receipt queues 124 associated to the matching filters 122. In one example approach, classifier 120 is configured with mask of length L. Processing of tunnel packets is described in detail in U.S. patent application Ser. No. 14/673,272, entitled "NIC-BASED PACKET ASSIGNMENT FOR VIRTUAL NETWORKS," the description of which is incorporated herein by reference.

Figure 8:
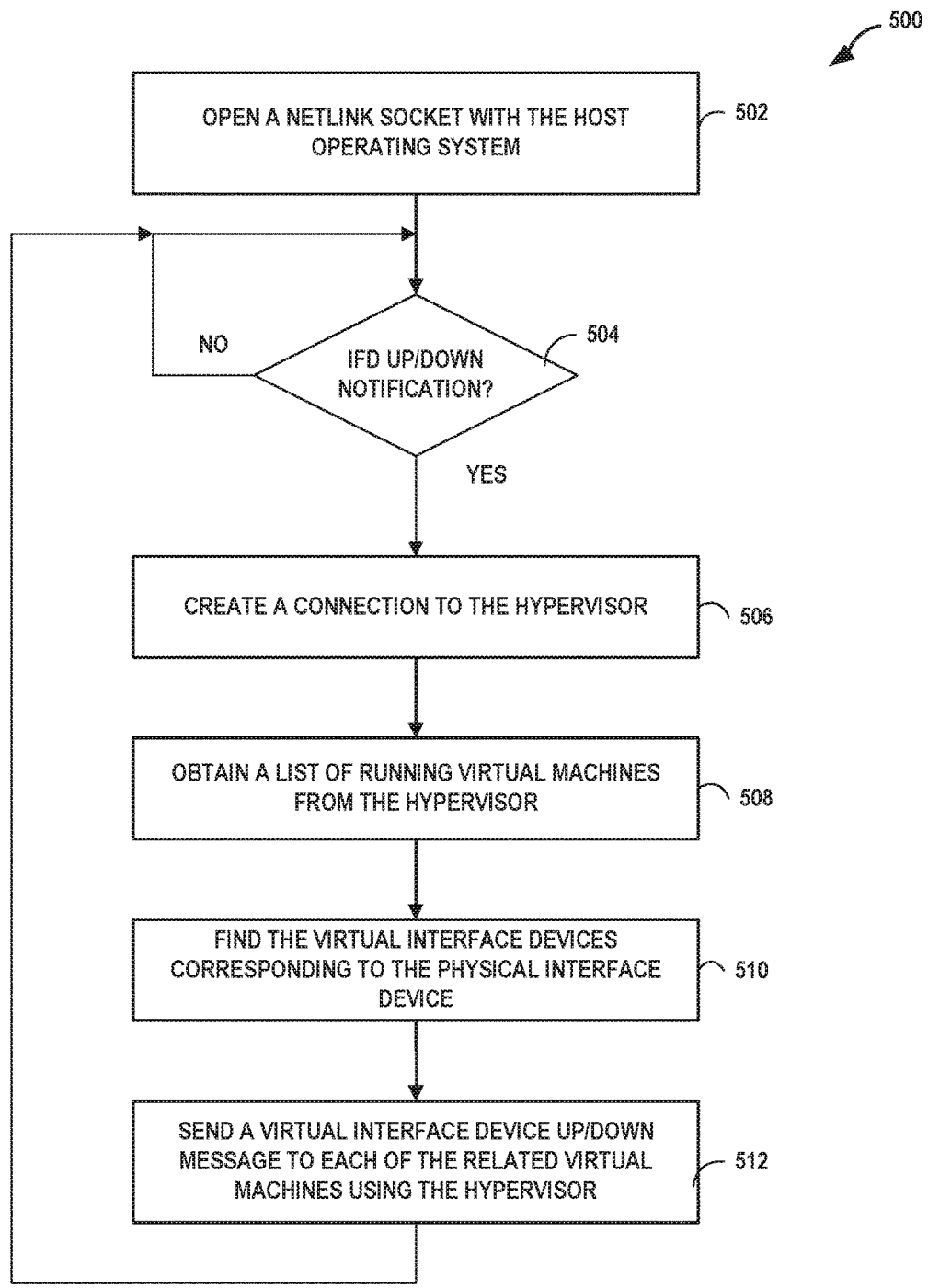
FIG. 8 is a flowchart illustrating another example method of detecting a failure in a link in a physical interface device and of notifying virtual machines of the failure, according to techniques described in this disclosure.

FIG. 8 is a flowchart illustrating another example method of detecting a failure in a link in a physical interface device and of notifying virtual machines of the failure, according to techniques described in this disclosure. In the example shown in FIG. 8, a JDM programmer installs a small C application called jlinkmon on the host. This app does the following:

A. Open a NETLINK socket with HOST OS (502)

B. Wait for any Physical IFD link up/down notification. (504)

B. Create a connection with QEMU hypervisor using libVirt. (506)

C. Whenever there is any state change message on NETLINK socket, request QEMU for list of running VMs. (508)

D. Create a Physical IFD to VM to Virtual IFD mapping. (510)

E. Send virtual IFD UP/DOWN message to each of the VMs involved using QEMU hypervisor. (512)

The solution does not include any periodic polling or periodic exchange of packet/message. It has no timer. All the operations are nonblocking and asynchronous.

Figure 9:
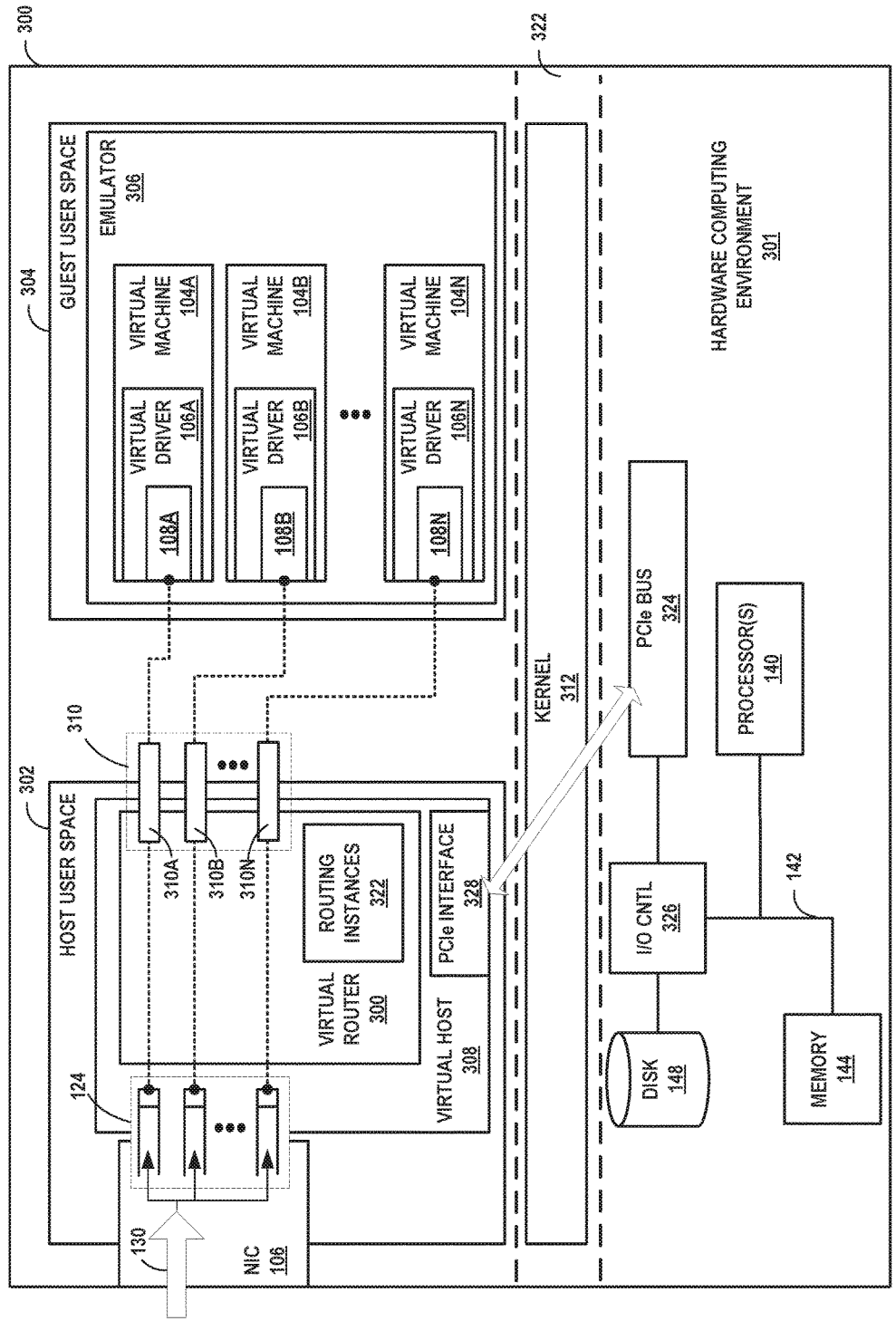
FIG. 9 is a block diagram illustrating an example architecture for a computing device configured to directly send packet data for inbound tunneled packets to destination virtual machines executing on the computing device.

FIG. 9 is a block diagram illustrating an example architecture for a computing device configured to directly send packet data for inbound tunneled packets to destination virtual machines executing on the computing device. Computing device 300 may represent an example instance of any of servers 12, 29, and 50, and of computing device 100.

In this example, a virtual host 308 executing in user space (host user space 302) for the computing device 300 creates a virtual router 300 for overlay networks. Routing instances 322 each include routing information for one of the overlay networks. An example framework for implementing a virtual host and offloading of services of virtual machine virtio-net devices to a user space application is provided by a Data Plane Development Kit (DPDK). An example of a DPDK is the Intel© DPDK developed by Intel© Corporation.

Because virtual host 308 executes in user space, emulator 306 may share information describing the physical address spaces of virtual machines 104 with the virtual host 308 to enable mapping of the virtual machines 104 physical memories into the address space of virtual host 308. As a result, NIC 106 may write packet data directly to the address spaces of virtual machines 104. In order to "route" inbound packets 130 in such cases, virtual router 300 may copy, from receipt queues 124 to transport buffers 310 and rather than copying entire packets from host user space 302, merely descriptions of the corresponding packet data (e.g., in a descriptor) that describes a memory location and a length of the packet data. This may reduce internal copying of packet data overall, which may improve forwarding throughput of computing device 300. Emulator 306 represents a device emulator, such as Quick Emulator (QEMU), and provides virtualization for virtual machines 104. In this sense, emulator 306 operates as a Hypervisor.

Transport buffers 310A-310N (collectively, "transport buffers 310") for respective virtual drivers 106 enable communication between virtual drivers 106 and the virtual device for NIC 106 emulated by the virtual host 308. Transport buffer 310A, for instance, may represent one or more queues for exchanging data between virtual driver 106A and virtual host 308. Transport buffers 310 may include virtio rings.

Using transport buffers 310, virtual drivers 106 may post addresses for receipt buffers 108 for receipt queues 124. For example, receipt queue 124A may receive empty receipt descriptors from virtual driver 106A via transport buffer 310A. The empty receipt descriptors may include (or be mapped from the virtual machine 104A address space by virtual host 308 to include) packet data buffer memory locations receipt buffer 108A.

Upon receiving a packet of inbound packets 130 and assigning the packet to receipt queue 124A for virtual machine 104A, NIC 106 may write packet data for the packet to a packet data buffer memory location indicated by an empty receipt descriptor. NIC 106 may further populate the no longer empty receipt descriptor with a description of the packet data (e.g., length), and advance the receipt queue 124A to indicate to virtual router 300 that a new packet has been pushed to receipt queue 124A. Virtual router 300 may then copy values of the receipt descriptor from receipt queue 124A to virtual driver 106A to indicate to virtual machine 106A that the new packet has been copied to buffer 108A.

NIC 106 may directly write packet data to receipt buffers 108 by issuing a DMA request. For example, computing device 300 includes PCIe interface 328 that connects to PCIe bus 324 of computing device 300 for communication with PCIe-based devices. PCIe interface 145 may provide a physical layer, data link layer and a transaction layer for supporting PCIe-based communications between NIC 106, processor(s) 140, and/or memory 144. As such, PCIe interface 328 is responsive to read/write requests from virtual host 308 for sending and/or receiving packet data in accordance with the PCIe protocol.

In this example, computing device 300 includes a system bus 142 coupling hardware components of hardware computing environment 301. System bus 142 couples processor(s) 140 to memory 144 and input/output (I/O) controller 326. I/O controller 326 provides access to storage disk 148 and NIC 106 via PCIe bus 324.

The techniques described herein, including in the preceding any of sections, may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. In a device having a processor, a network interface card with a physical link, a host operating system executing on the processor and a virtualization environment executing on the host operating system, wherein the virtualization environment manages a plurality of virtual machines, a method comprising:
- detecting, within an interface fault detection application running on the host operating system, a change in status for the physical link;
- requesting, by the interface fault detection application, in response to the detected change in the status of the physical link, and from the virtualization environment, a list of virtual machines that are currently active in the virtualization environment;
- determining, within the interface fault detection application and from the list of active virtual machines, two or more active virtual machines associated with the physical link, wherein each active virtual machine associated with the physical link includes one or more virtual interface devices (IFDs), wherein at least one of the virtual IFDs sends and receives information via the physical link; and
- transmitting a virtual IFD status notification message from the interface fault detection application through the virtualization environment to the active virtual machines of virtual IFDs impacted by the physical link status change, the virtual IFD status notification message identifying the physical link status change.

2. The method of claim 1, wherein detecting a change in physical link status for a physical link in a network interface card includes receiving an interrupt from the network interface card, the interrupt associated with the change.

3. The method of claim 1, wherein determining, from the list of active virtual machines, two or more active virtual machines associated with the physical link includes creating, from the list of active virtual machines, a mapping of physical link to virtual IFD to virtual machine.

4. The method of claim 3, wherein detecting a change in physical link status for a physical link in a network interface card includes receiving an interrupt from the network interface card, the interrupt associated with the change in physical link status.

5. The method of claim 1, wherein detecting a change in physical link status for a physical link in a network interface card includes detecting a fault in the physical link.

6. The method of claim 5, wherein the method further includes establishing a connection between the interface fault detection application and the virtualization environment using libVirt;
- wherein detecting a change in physical link status for a physical link in a network interface card further includes detecting resolution of the fault; and
- wherein transmitting a virtual IFD status notification message through the virtualization environment to the active virtual machines of virtual IFDs impacted by the physical link status change includes transmitting, via the connection and to the active virtual machines of virtual IFDs impacted by the physical link status change, a virtual IFD status notification message noting resolution of the fault.

7. The method of claim 5, wherein detecting a change in physical link status for a physical link in a network interface card further includes detecting when a measured parameter associated with the physical link passes through a threshold.

8. The method of claim 5, wherein detecting a change in physical link status for a physical link in a network interface card further includes detecting when a measured parameter associated with the physical link passes through a programmable threshold.

9. A computing device, comprising:
- a network interface card having at least one physical interface device (IFD);
- a memory;
- a processor connected to the memory and to the network interface card; and
- a host operating system executing on the processor,
- wherein the memory includes instructions stored therein, wherein the instructions, when executed by the processor, establish an IFD fault monitor executing on the host operating system, wherein a hypervisor executing on the host operating system, wherein and a plurality of virtual machines executing within the hypervisor, wherein at least two of the virtual machines include a virtual IFD connected to the physical IFD, and
- wherein, when the IFD fault monitor detects a physical link status change in the physical IFD, the IFD fault monitor requests from the hypervisor a list of virtual machines that are currently active in the hypervisor, determines, from the list of active virtual machines, virtual IFDs impacted by the physical link status change and sends a physical link status change notification through the hypervisor to virtual machines that have virtual IFDs impacted by the physical link status change.

10. The computing device of claim 9, wherein determining virtual IFDs impacted by the physical link status change includes creating, from the list of active virtual machines, a mapping of physical IFD to virtual IFD to virtual machine, wherein each active virtual machine associated with the physical IFD includes one or more virtual IFDs, wherein each virtual IFD sends and receives information via the physical IFD.

11. The computing device of claim 9, wherein the IFD fault monitor detects a physical link status change in the physical IFD via an interrupt received from the network interface card, the interrupt associated with the change in physical link status.

12. The computing device of claim 9, wherein the IFD fault monitor detects a physical link status change notification in the physical IFD when a fault is detected and when a fault is resolved, and
- wherein the IFD fault monitor transmits a physical link status change notification through the hypervisor to the virtual IFDs impacted by the physical link status change when a fault in the physical IFD is detected and when a fault in the physical IFD is resolved.

13. The computing device of claim 9, wherein, when a measured parameter associated with the physical IFD passes through a threshold, the IFD fault monitor detects a physical link status change notification in the physical IFD and transmits a physical link status change notification through the hypervisor to the virtual IFDs impacted by the physical link status change.

14. A system, comprising:
- a network; and
- a plurality of routing devices connected by the network, wherein one or more of the routing devices includes a computing device having:
  - a memory;
  - a processor connected to the memory;
  - a host operating system executing on the processor;
  - a virtualization environment executing on the host operating system, wherein the virtualization environment manages a plurality of virtual machines; and
  - a physical interface device (IFD) connected the processor, wherein the physical IFD includes a physical link;

wherein the memory includes instructions executable by the processor, the instructions when executed causing the processor to:
- detect, within an interface fault detection application running on the host operating system, a change in physical link status of the physical IFD;
- request, by the interface fault detection application, in response to the detected change in the status of the physical link, and from the virtualization environment, a list of virtual machines that are currently active in the virtualization environment;
- determine, within the interface fault detection application and from the list of active virtual machines, two or more active virtual machines associated with the physical link, wherein each active virtual machine associated with the physical link includes one or more virtual interface devices (IFDs), wherein at least one of the virtual IFDs sends and receives information via the physical link; and
- transmitting a virtual IFD status notification message from the interface fault detection application through the virtualization environment to the active virtual machines of virtual IFDs impacted by the physical link status change, the virtual IFD status notification message identifying the physical link status change.

15. The system of claim 14, wherein the instructions that when executed by the processor cause the processor to determine, from the list of active virtual machines, two or more active virtual machines associated with the physical link include instructions that when executed by the processor cause the processor to create, from the list of active virtual machines associated with the physical IFD, a mapping of physical IFD to virtual IFD to virtual machine.

16. The system of claim 15, wherein detecting a change in physical link status of the physical IFD includes receiving an interrupt from a network interface card, the interrupt associated with the change in physical link status.

17. The system of claim 15, wherein detecting a change in physical link status of the physical IFD includes detecting a fault in a link of the physical IFD.

18. The system of claim 17, wherein detecting a change in physical link status of the physical IFD further includes detecting resolution of the fault and wherein the memory further includes instructions executable by the processor, the instructions when executed by the processor causing the processor to transmit a virtual IFD status notification message to the active virtual machines of virtual IFDs impacted by the fault, the virtual IFD status notification message notifying the virtual IFDs impacted by the fault that the link is up.

19. The system of claim 17, wherein detecting a change in physical link status for a physical IFD further includes detecting when a measured parameter associated with the physical IFD passes through a programmable threshold.

20. The computing device of claim 9, wherein the instructions further include instructions that, when executed by the processor, establish a connection between the IFD fault monitor and the hypervisor via libVirt,
- wherein requesting the list of active virtual machines that are currently active in the hypervisor includes transmitting the request to the hypervisor via the connection, and
- wherein sending the physical link status change notification includes transmitting the physical link status change notification to the hypervisor via the connection.

21. The system of claim 14, wherein the instructions further include instructions that, when executed by the processor, establish a connection between the interface fault detection application and the virtualization environment via libVirt,
- wherein requesting the list of active virtual machines that are currently active in the virtualization environment includes transmitting the request to the hypervisor via the connection, and
- wherein transmitting the virtual IFD status notification message includes transmitting the virtual IFD status notification message to the hypervisor via the connection.

* * * * *